H. H. BARSBY AND W. HIGH.
MULTIFORM TRAIN AUDITING CHECK.
APPLICATION FILED OCT. 31, 1917.

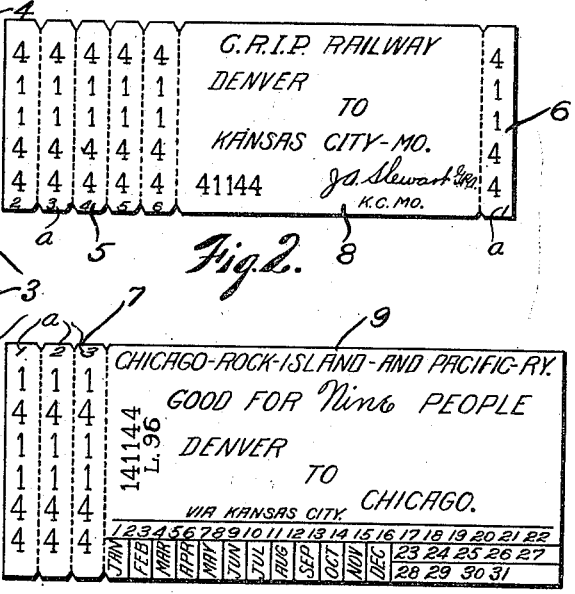
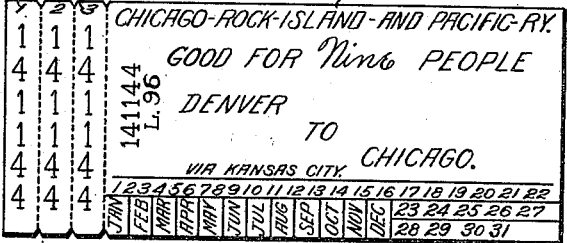
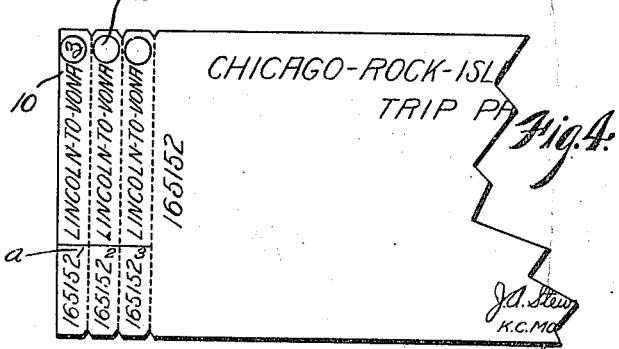
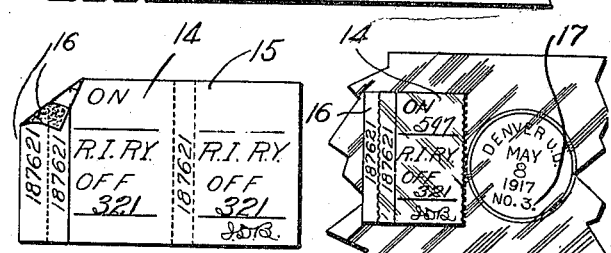

1,320,112.

Patented Oct. 28, 1919.
2 SHEETS—SHEET 2.

Inventor
Harry H. Barsby 2d W.m High.
By
Attorney

UNITED STATES PATENT OFFICE.

HARRY H. BARSBY AND WILLIAM HIGH, OF DENVER, COLORADO.

MULTIFORM TRAIN AUDITING-CHECK.

1,320,112.          Specification of Letters Patent.      Patented Oct. 28, 1919.

Application filed October 31, 1917. Serial No. 199,465.

*To all whom it may concern:*

Be it known that we, HARRY H. BARSBY and WILLIAM HIGH, citizens of the United States, residing at the city and county of Denver and State of Colorado, have invented certain new and useful Improvements in Multiform Train Auditing-Checks; and we do declare the following to be a full, clear, and exact description of the invention, such as will enable others skilled in the art to which it appertains to make and use the same, reference being had to the accompanying drawings and to the characters of reference marked thereon, which form a part of this specification.

This invention relates to all classes of railroad tickets including transportation and Pullman tickets, and the object thereof is to prevent collusion on the part of conductors and ticket sellers or agents in reselling tickets, to enable a railroad to determine accurately over just what divisions of its road any ticket or part thereof was used, as well as to check the use of Pullman tickets.

This is accomplished by providing each ticket with a plurality of small auditing checks, each bearing the ticket, form and serial numbers. One of these is to be detached by each person to whom the ticket is presented and deposited in a lock box instead of his punching the ticket or a coupon as is usual. This also avoids having so many punch marks in the ticket or coupon that some of the indicia thereon is obliterated and consequent difficulties are met by the clearing houses and auditors. With the proposed system, each ticket or coupon is punched only once and that by the conductor who takes it up.

These tickets with their checks are to be used as part of a system which requires the ticket seller to tear off a part of the ticket and deposit it in a lock box or other receptacle, there being a lock box for each train, and which also requires each conductor to deposit a part of the ticket in a lock box. A company man may then inspect the boxes to see if their contents agree. The gateman may also detach a check.

Where stopovers are allowed, pasters are provided in duplicate which are to be filled out to indicate the stopover point, one part being pasted on the back of the ticket and the other part dropped into the lock box, one portion of the part pasted on the ticket being adapted to be detached by the conductor to whom the ticket is presented when the passenger boards the train again.

In the drawings forming a part of this specification,

Figure 1 shows the ordinary coupon ticket with auditing checks.

Fig. 2 shows a common card ticket with auditing checks.

Fig. 3 shows a party ticket with auditing checks.

Fig. 4 shows a trip pass with auditing checks.

Fig. 5 shows an "on-and-off" paster.

Fig. 6 shows the manner of using the paster.

Figure 8:
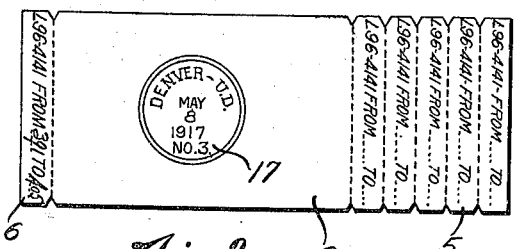
Fig. 8 shows the reverse of the ticket of Fig. 2.

In the coupon ticket shown in Fig. 1, the contract portion 1 and the coupons 2 are the same as usual in this form of ticket. Extending from the upper edge of the contract portion is a plurality of small auditing checks 3, each check bearing the ticket and form numbers, the railroad issue, and the serial numbers $a$, the checks being adapted to be detached through the medium of perforations or scoring. Above the checks the usual auditor's advice 4 extends. In Figs. 2 and 3, showing card and party tickets respectively, the auditing checks 5, 6 and 7 are attached to the body portions 8 and 9, the front faces of the checks carrying the ticket and serial numbers and the rear faces carrying the form number together with blanks in which to indicate between what stations the passenger was carried while the conductor collecting the check was on duty (see Fig. 8).

In these forms of tickets the ticket seller tears off one of the checks in place of the auditor's advice on other forms, tearing off the single end check 6 in the form shown in Fig. 2. For trip passes the checks 10 carry the pass and serial numbers, the points between which the pass is valid, and spaces 12 in which to indicate the number of persons riding on the pass, as indicated in Fig. 4.

Figure 7:
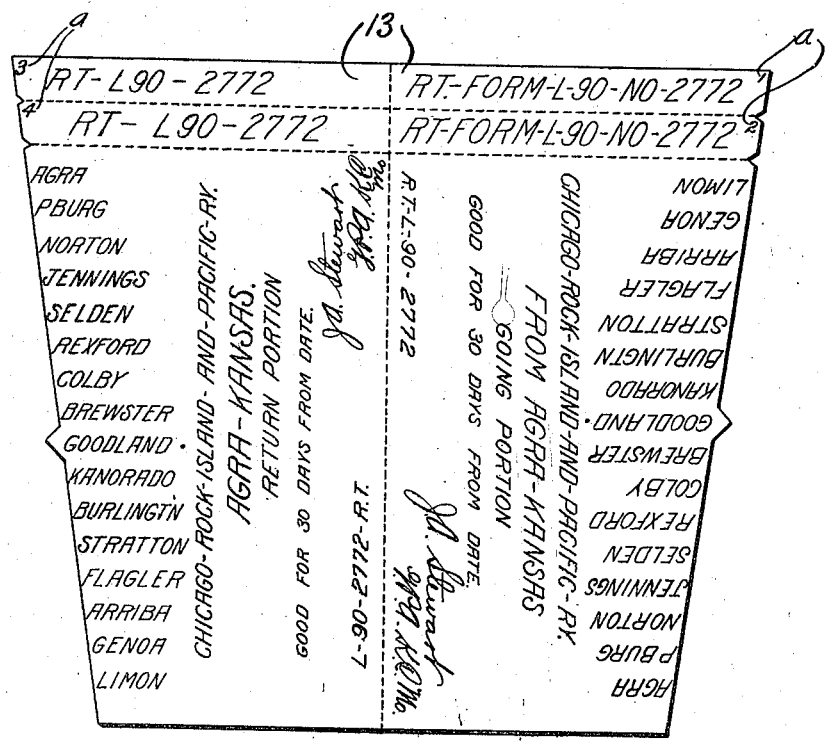
Fig. 7 shows a "simplex" round trip ticket with auditing checks.

Similar checks 13 are provided on the round trip simplex tickets as shown in Fig. 7.

In Figs. 5 and 6 an "on-and-off" paster 14 is shown. This is provided with a detachable duplicate portion 15 and a detachable stub 16. Each of these three parts carries the same number identifying them with each other. The back of the stub 16 is gummed. Part 14 carries spaces in which to indicate at what station a passenger got off in making a stop-over and also where he got on again, which might or might not be the station where he got off. When a passenger desires to make a stop-over the conductor fills in the "off" space on portion 15 making a carbon of the notation on portion 14. Portion 15 is torn off and dropped into his box. Stub 16 is pasted on the back of the ticket, portion 14 attached thereto being free. When the passenger again boards a train the conductor on this last train indicates the station in the "on" space on portion 14, detaches said portion 14 and deposits it in his box, leaving stub 16 permanently attached to the back of the ticket. If the passenger had doubled back for some reason, as is often the case, and got on at a station which he had passed in the earlier part of his trip, the conductor collects a fare for the distance between said station and the station where he got off. The use of arbitrary station numbers prevents change of the number, while the presence of the part 14, or even the stub 16 alone if part 14 had been removed, would indicate that a stopover had been made. The pasters may be initialed by the conductors.

To complete the system, each ticket seller's dating stamp has his own number and this appears on the back of the ticket when it is dated, as shown at 17.

In the operation of the system, each ticket seller deposits either the auditor's advice or a check, according to the kind of ticket, in his lock box. The gateman does likewise. Each conductor tears off and deposits in his lock box a check, instead of punching a coupon 2 as is usual, except the conductor whose run reaches the destination called for by the ticket or coupon. This last conductor punches the coupon or ticket and drops it in his box. If a passenger makes a lay over, an on-and-off paster is filled out, one part attached to the back of the ticket and the other part dropped in the lock box. If a passenger pays cash fare, the conductor, after making a memorandum in his train book, drops the fare receipt or a stub into his lock box.

In connection with the use of Pullman tickets, a check is deposited in a box by the Pullman ticket seller, and a check is given by the Pullman conductor to each train conductor who deposits the same in his box along with a check of the passenger's transportation or the transportation itself as the case may be.

In this way a part of every ticket is placed in the lock box by the conductor. Also a part of every ticket is placed in the ticket seller's lock box. An inspector may take the ticket seller's lock box, board the train and, after the conductor has made the rounds, suddenly put in his appearance and ask for the conductor's lock box. He may then investigate to determine whether the ticket seller's advices and checks agree with the conductor's tickets and checks. Failure to agree indicates fraud.

This system also enables the company to determine on just what parts of the road a ticket or a coupon was used. The ticket may be traced through the serial numbers step by step from the man who sold it all the way through until it is turned in by the last conductor to whom it was presented. This system of tracing a passenger even through the Pullman car will be of particular value in connection with law suits against the road, giving the road valuable information regarding the passenger's whereabouts.

Having described our invention, what we claim is:

1. The combination with a railroad ticket of a plurality of detachable auditing checks and an auditor's advice, each of which bears indicia sufficient to identify it with the ticket and with the other checks, the checks also being suitably distinct from one another, the auditor's advice being of the same width as the ticket and the auditing checks being positioned between the advice and the ticket and formed in a block of the same width as the advice and the ticket.

2. The combination with a railroad ticket, of a plurality of detachable auditing checks, each of which bears indicia sufficient to identify it with the ticket and with the other checks, the checks also being suitably distinguished from one another, the auditing checks being formed in a block of the same width as the ticket.

3. The combination with a railroad ticket having a member bearing certain indicia, of a detachable "off-and-on" member having appropriately designated spaces in which to indicate where a passenger got off and where he got on again in making a stop over, and a second detachable member having an appropriately designated space in which to indicate where he got off, the detachable members bearing indicia sufficient to identify them with the indicia on the first named member.

4. The combination with a railroad ticket having a member bearing certain indicia, of a detachable "off-and-on" member having appropriately designated spaces in which to indicate where a passenger got off and where he got on again in making a stop over, the detachable member bearing indicia sufficient to identify it with the first named member.

5. The combination with a railroad ticket of a paster applied thereto having a stub portion, a detachable member having appropriately designated spaces in which to indicate where a passenger got off and where he got on again in making a stop-over, and a second detachable member having an appropriately designated space in which to indicate where he got off, all parts of the paster having indicia sufficient to identify them with one another.

6. An on-and-off or stop-over paster for use on railroad tickets, comprising a portion having an appropriately designated space to indicate where a passenger got off and an appropriately designated space to indicate where he got on again, a stub detachable therefrom and gummed on one side, another portion detachable from the first named portion and having an appropriately designated space in which to indicate where the passenger got off.

7. An on-and-off or stop-over paster for use on railroad tickets, comprising a portion having an appropriately designated space to indicate where a passenger got off and an appropriately designated space to indicate where he got on again, a stub detachable therefrom and gummed on one side, another portion detachable from the first named portion and having an appropriately designated space in which to indicate where the passenger got off, each of the three parts of the paster carrying indicia to identify them with each other.

8. The combination with a railroad ticket of an "off-and-on" slip, having a stub portion applied to the ticket, a member detachable from said stub portion and having appropriately designated spaces in which to indicate where a passenger got off and where he got on in making a stop-over, and a second member detachable from the first-named detachable member having an appropriately designated space in which to indicate where the passenger got off, all of the parts of the "off-and-on" slip having indicia sufficient to identify them with one another.

9. The combination with a railroad ticket of an "off-and-on" slip, having a stub portion secured to the ticket, and a member detachable from said stub portion, said stub and said detachable member having identifying indicia, and said member having appropriately designated spaces thereon for "on" or "off" notations.

10. The combination with a railroad ticket of an "off-and-on" slip having a stub portion applied to the ticket, a member detachable from said stub portion, and a second detachable member, said stub and said detachable members having identifying indicia, and said members having appropriately designated spaces thereon for "off-and-on" notations.

In testimony whereof we affix our signatures.

HARRY H. BARSBY.
WILLIAM HIGH.

Copies of this patent may be obtained for five cents each, by addressing the "Commissioner of Patents, Washington, D. C."